(12) United States Patent
Lee et al.

(10) Patent No.: US 11,989,732 B2
(45) Date of Patent: May 21, 2024

(54) METHOD AND SYSTEM FOR DETECTING FRAUDULENT FINANCIAL TRANSACTION

(71) Applicant: LINE Corporation, Tokyo (JP)

(72) Inventors: Changseon Lee, Tokyo (JP); Jaeyong Lim, Tokyo (JP)

(73) Assignee: LY Corporation, Tokyo (JP)

( * ) Notice: Subject to any disclaimer, the term of this patent is extended or adjusted under 35 U.S.C. 154(b) by 0 days.

(21) Appl. No.: 17/192,442

(22) Filed: Mar. 4, 2021

(65) Prior Publication Data

US 2021/0279729 A1    Sep. 9, 2021

(30) Foreign Application Priority Data

Mar. 9, 2020 (KR) ........................ 10-2020-0029187

(51) Int. Cl.
*G06Q 20/40* (2012.01)
*G06N 20/00* (2019.01)
*G06Q 40/12* (2023.01)

(52) U.S. Cl.
CPC ......... *G06Q 20/4016* (2013.01); *G06N 20/00* (2019.01); *G06Q 40/12* (2013.12)

(58) Field of Classification Search
CPC ..... G06Q 20/4016; G06Q 40/12; G06N 20/00
See application file for complete search history.

(56) References Cited

U.S. PATENT DOCUMENTS

| | | | | |
|---|---|---|---|---|
| 10,242,402 | B1 * | 3/2019 | Soccorsy | ................. H04L 67/10 |
| 2009/0182653 | A1 * | 7/2009 | Zimiles | ................. G06Q 40/12 |
| | | | | 707/999.005 |
| 2018/0218369 | A1 * | 8/2018 | Xiao | ................. G06Q 20/4016 |
| 2020/0184050 | A1 * | 6/2020 | Toth | ................. G06F 21/32 |

FOREIGN PATENT DOCUMENTS

| | | |
|---|---|---|
| KR | 10-2009-0039128 A | 4/2009 |
| KR | 101381921 B1 | 4/2014 |
| KR | 101675416 B1 | 11/2016 |
| KR | 10-2017-0083330 A | 7/2017 |
| KR | 10-2019-0048605 A | 5/2019 |
| KR | 102038274 B1 | 10/2019 |

OTHER PUBLICATIONS

Korean Office Action dated Apr. 4, 2022 by the Korean Patent Office, corresponding to Korean patent application No. 10-2020-0029187.
Korean Office Action dated Jun. 24, 2021 by the Korean Patent Office, corresponding to Korean Patent Application No. 10-2020-029187.

* cited by examiner

*Primary Examiner* — Peter Ludwig
*Assistant Examiner* — Reva R Moore
(74) *Attorney, Agent, or Firm* — Harness, Dickey & Pierce, P.L.C.

(57) ABSTRACT

Disclosed is a method and system for detecting a fraudulent financial transaction including collecting, by processing circuitry, transaction details from a financial institution, classifying, by the processing circuitry, each of a plurality of users into a respective set of groups among a plurality of groups for each of a plurality of transaction action types, the plurality of users corresponding to the transaction details, and determining, by the processing circuitry, whether a first user among the plurality of users is in a risk group based on a first set of groups among the plurality of groups into which the first user is classified.

21 Claims, 6 Drawing Sheets

500

| User a | Score | Buy | Sell | Send | Receive | Deposit | Withdrawal | External Send | External Receive |
|---|---|---|---|---|---|---|---|---|---|
| Group A | 10 | O | | O | | | O | O | |
| Group B | 8 | | O | | | O | | | |
| Group C | 6 | | | | | | | | |
| Group D | 4 | | | | | | | | |
| Group E | 2 | | | | O | | | | O |

FIG. 6

| User a | Score | Buy | Sell | Send | Receive | Deposit | Withdrawal | External Send | External Receive |
|--------|-------|-----|------|------|---------|---------|------------|---------------|------------------|
| Group A | 10 | | | | | | | | |
| Group B | 8 | | | | | | | | |
| Group C | 6 | | | | | | | | |
| Group D | 4 | | | | | | | | |
| Group E | 2 | O | O | O | O | O | O | O | O |

# METHOD AND SYSTEM FOR DETECTING FRAUDULENT FINANCIAL TRANSACTION

CROSS-REFERENCE TO RELATED APPLICATION(S)

This U.S. non-provisional application claims the benefit of priority under 35 U.S.C. § 119 to Korean Patent Application No. 10-2020-0029187, filed Mar. 9, 2020, the entire contents of which are incorporated herein by reference in their entirety.

TECHNICAL FIELD

At least one example embodiment relates to a method and system for detecting a fraudulent (or abnormal) financial transaction.

BACKGROUND

An electronic financial transaction refers to a transaction in which a financial institution or an electronic financial business operator provides a financial product and service through an electronic device, and a user uses the provided financial product and service in an automated manner without directly confronting or communicating with an operator of the financial institution or the electronic financial business operator. Such a financial transaction has been popularized due to the development of a data communication network, such as the Internet. In particular, electronic finance using a mobile device such as a smartphone is currently rapidly spreading.

When an electronic financial transaction request, such as a money transfer, is received at a financial institution server from a user, a general fraud financial detection system determines whether the corresponding request is fraudulent by referring to electronic financial transaction request details and use patterns of previous customers, and accordingly, detects an occurrence of a fraudulent financial transaction by configuring the electronic financial transaction in a manner of approving or rejecting the same or by using a rule-based threshold.

SUMMARY

At least one example embodiment provides a fraudulent financial transaction detection method and system that may collect transaction details occurring in a financial institution, may cluster users related to the transaction details into a plurality of groups for each of transaction actions (e.g., at least two transaction actions among Buy, Sell, Send, Receive, Deposit, Withdrawal, External Send, and/or External Receive), and may classify an arbitrary user into a risk group based on scores set for groups for each of the transaction actions.

According to an aspect of at least one example embodiment, there is provided a fraudulent financial transaction detection method performed by a computer apparatus comprising processing circuitry, the fraudulent financial transaction detection method including collecting, by the processing circuitry, transaction details from a financial institution, classifying, by the processing circuitry, each of a plurality of users into a respective set of groups among a plurality of groups for each of a plurality of transaction action types, the plurality of users corresponding to the transaction details, and determining, by the processing circuitry, whether a first user among the plurality of users is in a risk group based on a first set of groups among the plurality of groups into which the first user is classified.

The determining may include determining whether the first user is in the risk group based on a sum of scores set for the first set of groups.

The plurality of transaction action types may include at least two actions among Buy, Sell, Send, Receive, Deposit, Withdrawal, External Send, or External Receive.

The classifying may include classifying each of the plurality of users into the respective set of groups by inputting the transaction details to a machine learning module trained to classify users into the plurality of groups for each of the plurality of transaction action types based on corresponding transaction details.

The machine learning module may be trained to output a score for each of the respective set of groups into which the users are classified.

The classifying may include calculating an average value for each of a plurality of transaction action items corresponding to the plurality of transaction action types, and classifying each of the plurality of users into the respective set of groups by clustering the plurality of users based on a distance between a value of each of the plurality of transaction action items and an average value of each of the plurality of transaction action items, the plurality of transaction action items corresponding to a plurality of transaction actions triggered by the plurality of users.

The classifying may include calculating a score of each of the plurality of groups using a distance formula based on the distance and a directivity.

The classifying may include classifying the plurality of users into the plurality of groups for each of the transaction action types based on a value of each of a plurality of transaction action items and a standard deviation of each of the plurality of transaction action items, the plurality of transaction action items corresponding to a plurality of transaction actions triggered by the plurality of users.

According to at least one example embodiment, the fraudulent financial transaction detection method may include generating a signal indicating that the first user is in the risk group in response to determining the first user is in the risk group. According to at least one example embodiment, the fraudulent financial transaction detection method may include causing a requested transaction to be blocked by sending the signal to the financial institution. According to at least one example embodiment, the fraudulent financial transaction detection method may include blocking a requested transaction in response to determining the first user is in the risk group.

According to an aspect of at least one example embodiment, there is provided a non-transitory computer-readable record medium storing instructions that, when executed by at least one processor, cause the at least one processor to perform the fraudulent financial transaction detection method.

According to an aspect of at least one example embodiment, there is provided a computer apparatus including processing circuitry. The processing circuitry is configured to collect transaction details from a financial institution, classify each of a plurality of users into a respective set of groups among a plurality of groups for each of a plurality of transaction action types, the plurality of users corresponding to the transaction details, and determine whether a first user among the plurality of users is in a risk group based on a first set of groups among the plurality of groups into which the first user belongs is classified.

According to at least one example embodiment, it is possible to collect transaction details occurring in a financial institution, cluster users related to the transaction details into a plurality of groups for each of transaction actions (e.g., at least two transaction actions among Buy, Sell, Send, Receive, Deposit, Withdrawal, External Send, and External Receive), and classify an arbitrary user into a risk group based on scores set for groups of each of the transaction actions.

Further areas of applicability will become apparent from the description provided herein. The description and specific examples in this summary are intended for purposes of illustration only and are not intended to limit the scope of the present disclosure.

BRIEF DESCRIPTION OF DRAWINGS

FIGS. 5 and 6 illustrate examples of groups to which users belong for each of a plurality of transaction actions.

DETAILED DESCRIPTION

Figure 1:
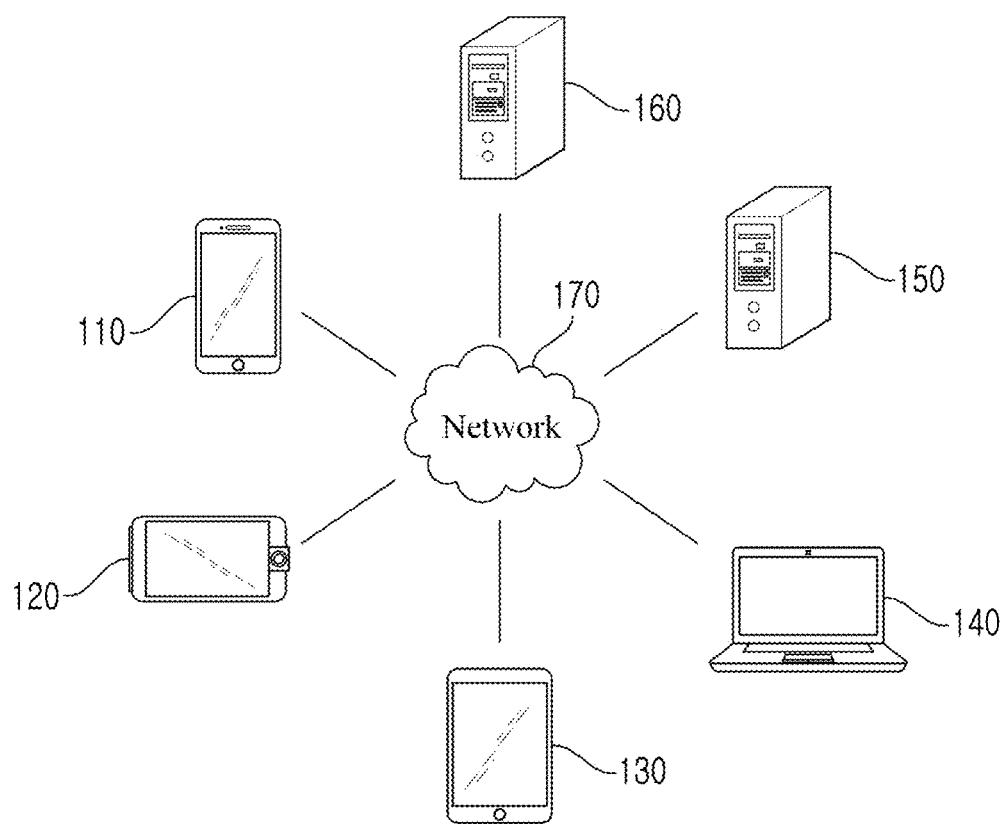
FIG. 1 is a diagram illustrating an example of a network environment according to at least one example embodiment.

At least one example embodiment will be described in detail with reference to the accompanying drawings. At least one example embodiment, however, may be embodied in various different forms, and should not be construed as being limited to only the illustrated examples. Rather, the illustrated examples are provided so that this disclosure will be thorough and complete, and will fully convey the concepts of this disclosure to those skilled in the art. Accordingly, known processes, elements, and techniques, may not be described with respect to at least one example embodiment. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as, or a similar meaning to, that commonly understood by one of ordinary skill in the art to which at least one example embodiment belongs. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned herein. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, at least one example embodiment may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of at least one example embodiment may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, at least one example embodiment will be described with reference to the accompanying drawings.

A fraudulent financial transaction detection system according to at least one example embodiment may be implemented by at least one computer apparatus. Here, a computer program may be installed and executed on the computer apparatus and the computer apparatus may perform a fraudulent financial transaction detection method according to at least one example embodiment under control of the executed computer program. The aforementioned computer program may be stored in a non-transitory computer-readable record medium to computer-implement the fraudulent financial transaction detection method in conjunction with the computer apparatus.

FIG. 1 illustrates an example of a network environment according to at least one example embodiment. Referring to FIG. 1, the network environment may include a plurality of electronic devices 110, 120, 130, and/or 140, a plurality of servers 150 and/or 160, and/or a network 170. FIG. 1 is provided as an example only. A number of electronic devices or a number of servers is not limited thereto. Also, the network environment of FIG. 1 is provided as an example of environments applicable to at least one example embodiment and the environment applicable to at least one example embodiment is not limited to the network environment of FIG. 1.

Each of the plurality of electronic devices 110, 120, 130, and/or 140 may be a fixed terminal or a mobile terminal that is configured as a computer apparatus. For example, the plurality of electronic devices 110, 120, 130, and/or 140 may be a smartphone, a mobile phone, a navigation device, a computer, a laptop computer, a digital broadcasting terminal, a personal digital assistant (PDA), a portable multimedia player (PMP), a tablet personal computer (PC), and/or the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and/or the Internet. Also, the network 170 may include at least one of network topologies that include a bus network, a star network, a ring network, a mesh network, a star-bus network, a tree or hierarchical network, and/or the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and/or 140 over the network 170. For example, the server 150 may be a system that provides a service to the plurality of electronic devices 110, 120, 130, and/or 140 connected over the network 170. For example, the service may include an instant messaging service, a game service, a group call service or a voice conference service, a messaging service, a mail service, a social network service, a map service, a translation service, a financial service, a payment service, a search service, and/or a content providing service.

Figure 2:
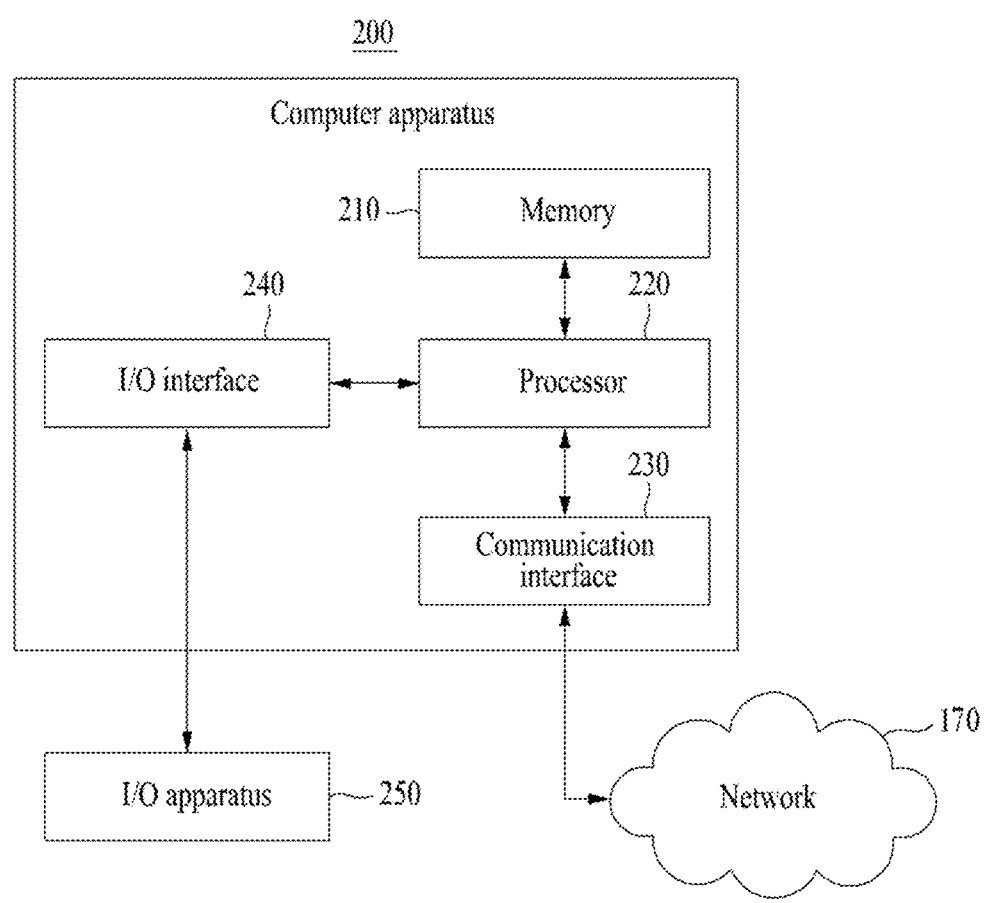
FIG. 2 is a diagram illustrating an example of a computer apparatus according to at least one example embodiment.

FIG. 2 is a block diagram illustrating an example of a computer apparatus according to at least one example embodiment. Each of the plurality of electronic devices 110, 120, 130, and/or 140, and/or the servers 150 and/or 160, may be implemented in, or by, a computer apparatus 200 of FIG. 2.

Referring to FIG. 2, the computer apparatus 200 may include a memory 210, a processor 220, a communication interface 230, and/or an input/output (I/O) interface 240. The memory 210 may include a permanent mass storage device, such as a random access memory (RAM), a read only memory (ROM), and/or a disk drive, as a non-transitory computer-readable record medium. The permanent mass storage device, such as a ROM and/or a disk drive, may be included in the computer apparatus 200 as a permanent storage device separate from the memory 210. Also, an OS and at least one program code may be stored in the memory 210. Such software components may be loaded to the memory 210 from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to at least one example embodiment, software components may be loaded to the memory 210 through the communication interface 230 instead of, or in addition to, the non-transitory computer-readable record medium. For example, the software components may be loaded to the memory 210 based on a computer program installed by files provided over the network 170.

The processor 220 may be configured to process instructions of a computer program by performing basic arithmetic operations, logic operations, and/or I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and other apparatuses, for example, the aforementioned storage devices, over the network 170. For example, the processor 220 of the computer apparatus 200 may transfer a request created based on a program code stored in the storage device such as the memory 210, to the other apparatuses over the network 170 under control of the communication interface 230. Inversely, a signal, an instruction, data, a file, etc., from another apparatus may be received at the computer apparatus 200 through the communication interface 230 of the computer apparatus 200. For example, a signal, an instruction, data, etc., received through the communication interface 230 may be transferred to the processor 220 or the memory 210, and a file, etc., may be stored in a storage medium, for example, the permanent storage device, further includable in the computer apparatus.

The I/O interface 240 may be a device used for interfacing with an I/O apparatus 250 (e.g., an input device and/or an output device). For example, an input device may include a device, such as a microphone, a keyboard, a mouse, etc., and an output device may include a device, such as a display, a speaker, etc. As another example, the I/O interface 240 may be a device for interfacing with an apparatus in which an input function and an output function are integrated into a single function, such as a touchscreen. The I/O apparatus 250 may be at least one input device and/or output device configured as a single device with (e.g., incorporated in) the computer apparatus 200. For example, a touchscreen, a microphone, a speaker, etc., may be included in the computer apparatus 200, such as a smartphone.

According to at least one example embodiment, the computer apparatus 200 may include a number of components greater than or less than a number of components shown in FIG. 2. However, some components according to the related art are not illustrated in detail. For example, the computer apparatus 200 may include at least a portion of the I/O apparatus 250, or may further include other components, for example, a transceiver, a database (DB), and/or the like.

Figure 3:
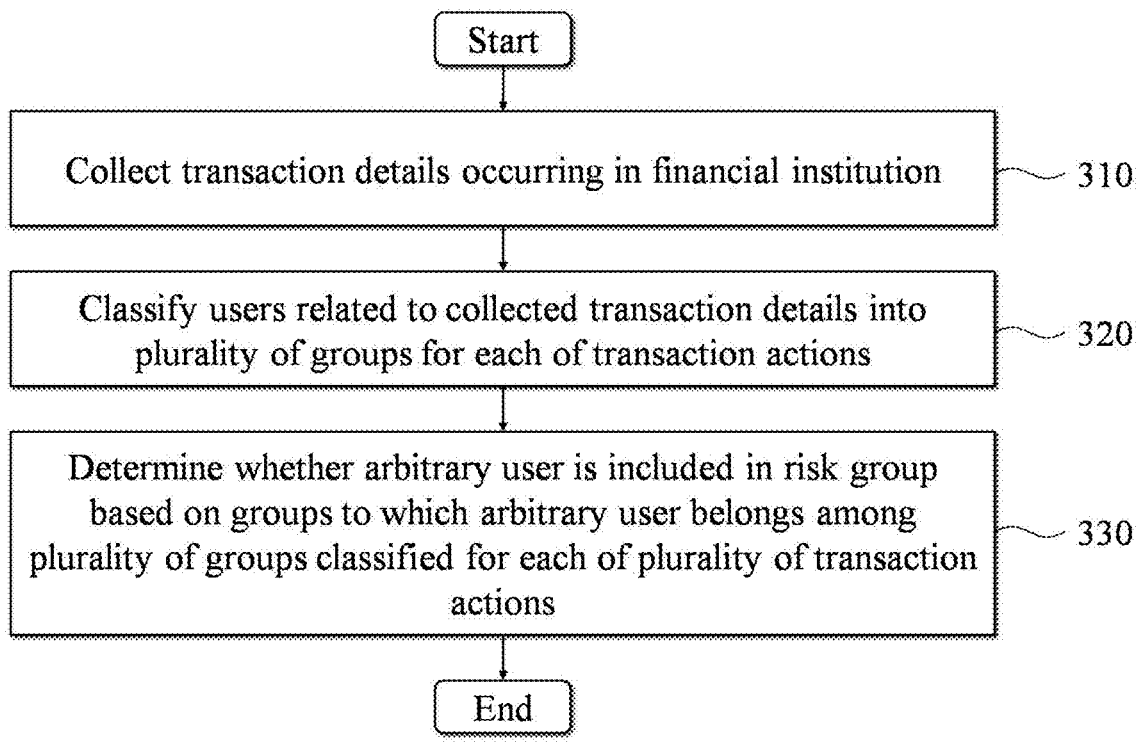
FIG. 3 is a flowchart illustrating an example of a fraudulent financial transaction detection method according to at least one example embodiment.

FIG. 3 is a flowchart illustrating an example of a fraudulent financial transaction detection method according to at least one example embodiment. The fraudulent financial transaction detection method of FIG. 3 may be performed by the computer apparatus 200. Here, the processor 220 of the computer apparatus 200 may be configured to execute a control instruction according to a code of at least one computer program, or a code of an OS, included in the memory 210. Here, the processor 220 may control the computer apparatus 200 to perform operations 310 to 330 included in the fraudulent financial transaction detection method of FIG. 3 in response to the control instruction provided from a code stored in the computer apparatus 200.

Referring to FIG. 3, in operation 310, the computer apparatus 200 may collect transaction details occurring in a financial institution. The computer apparatus 200 may receive the transaction details from a system of at least one financial institution through the network 170 and the communication interface 230. The collected transaction details may be input to the computer apparatus 200 through the I/O interface 240. According to at least one example embodiment, the transaction details may include a transaction count, a transaction amount, etc., in correspondence with a respective transaction action and a respective user. According to at least one example embodiment, the computer apparatus 200 may collect transaction details of a plurality of transactions conducted by, or on behalf of, a plurality of users of one or more financial institutions.

In operation 320, the computer apparatus 200 may classify users related to (e.g., corresponding to) the collected transaction details into a plurality of groups for each of a plurality of transaction actions (may also be referred to herein as transaction action types). According to at least one example embodiment, each user may be classified into a respective set of groups among the plurality of groups for each of the transaction action types. Here, the transaction actions may include at least two actions among Buy, Sell, Send, Receive, Deposit, Withdrawal, External Send, and/or External Receive. Here, "External" may represent outside a country (e.g., outside of the country in which the financial institution and/or a user is located) in a general financial transaction and also may represent outside a system in which a virtual currency associated with the computer apparatus 200 is traded in an environment using the virtual currency.

For example, it is assumed that the transaction actions include "Send" and "Receive." In this case, the computer apparatus 200 may classify users triggering the transaction action "Send" into a plurality of groups (e.g., three groups, Group A, Group B, and Group C) based on transaction details collected in association with the transaction action "Send" and may classify users triggering the transaction action "Receive" into a plurality of groups (e.g., four groups of Group D, Group E, Group F, and Group G) based on transaction details collected in association with the transaction action "Receive." The same number of groups may be generated for each of the transaction actions and/or, similar to the above example, a different number of groups may also be for each of the transaction actions. In this case, a user triggering the transaction action "Send" may be included in one of Group A, Group B, and/or Group C, and a user triggering the transaction action "Receive" may be included in one of Group D, Group E, Group F, and/or Group G. Also, a user triggering all of the transaction actions "Send" and "Receive" may be included in one of Group A, Group B, and/or Group C, and one of Group D, Group E, Group F, and/or Group G.

According to at least one example embodiment of classifying users, it is possible to use a machine learning module trained to classify users related to transaction details into a plurality of groups for each of the transaction actions based on existing transaction details (e.g., corresponding transaction details associated with each of the users). In this case, the computer apparatus 200 may classify the users related to the collected transaction details into the plurality of groups for each of the transaction actions by inputting the transaction details collected in operation 310 to the trained machine learning module. According to at least one example embodiment, the machine learning module may be further trained to output a score for each of the groups into which the users are classified. According to at least one example embodiment, the score may be used for determining whether an arbitrary user is included in a risk group in operation 330. According to at least one example embodiment, the machine learning module may be trained based on a set of reference transaction action items. The set of reference transaction items may include risky, or fraudulent, transaction items and safe transaction items. The machine learning module may be trained until the machine learning module reaches a threshold level of accuracy in scoring the reference transaction action items.

According to at least one example embodiment of classifying users, the computer apparatus 200 may calculate an average value for each transaction action item of the transaction actions, and may classify the users into the plurality of groups for each of the transaction actions by clustering the users based on a distance between a value of each item of each of transaction actions triggered by the users and an average value of a corresponding item. Here, transaction action items may include, for example, items "transaction count" and "transaction amount." For example, it may be assumed that an item for the transaction action "Send" is set as "transaction count." Here, users triggering the transaction action "Send" may be assumed as {a, b, c, d, e, f, g, h, i, j} and the corresponding "transaction count" of each of the users may be assumed as {1, 3, 2, 120, 2, 3, 5, 2, 1, 1}. In this case, an average value of the item "transaction count" for the transaction action "Send" may be 14 (=(1+3+2+120+2+3+5+2+1+1)/10). Here, the computer apparatus 200 may set a criterion of a group based on the average value. For example, the computer apparatus 200 may set, to Group 1, users having a "transaction count" in the range of 10 to 18, may set, to Group 2, users having a "transaction count" of 9 or less, and may set, to Group 3, users having "transaction count" of 19 or more. In this case, the users {a, b, c, e, f, g, h, i, j} may be classified into group 2 and the user {d} may be classified into Group 3. This example is merely provided to improve understanding and a plurality of items (e.g., both a "transaction count" and a "transaction amount") may be present for a single transaction action. In this case, users may be classified into a group by aggregating distances calculated for the respective items. For example, each of values of distances calculated for the respective items may be converted to a value between 0 and 1, and a sum or a weighted sum thereof may be used to classify the users. Also, a number of groups or a criterion for a group classification may be variously set. For example, the computer apparatus 200 may use a standard deviation of a value of each item of each of transaction actions triggered by users as a criterion for classifying groups. That is, the computer apparatus 200 may classify the users into the plurality of groups for each of the transaction actions based on the value of each item of each of the transaction actions triggered by the users and the standard deviation of the value of each item. According to at least one example embodiment, the transaction action items are not limited to the "transaction count" and "transaction amount", and additional and/or different transaction action items may be used for classifying the users.

Figure 4:
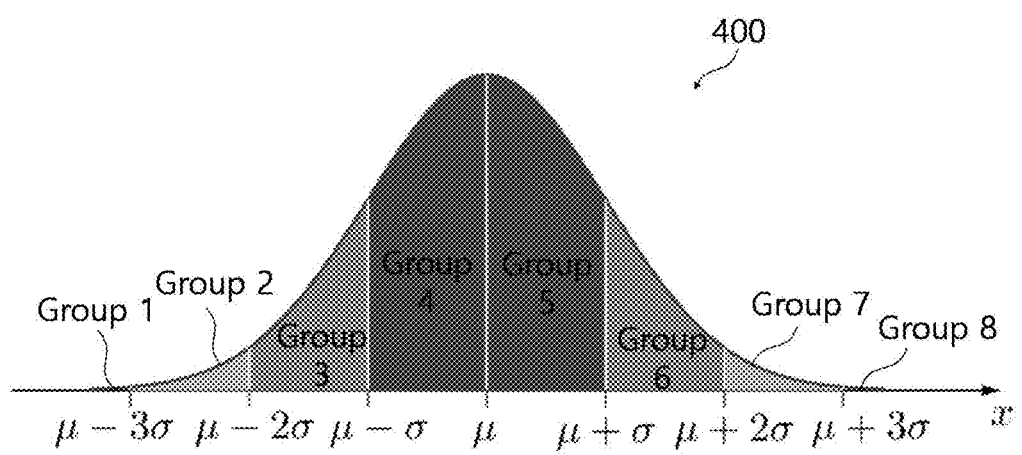
FIG. 4 illustrates an example of classifying users using a standard deviation according to at least one example embodiment.

FIG. 4 illustrates an example of classifying users using a standard deviation according to at least one example embodiment. Referring to FIG. 4, a graph 400 represents a probability density function when a probability variable X follows a normal distribution with an average of $\mu$ and a standard deviation of $\sigma$. Here, it is assumed that the probability density function has values of a specific item (e.g., a transaction count, transaction amount, etc.) for an arbitrary transaction action as a population (e.g., generated by the computer apparatus 200 based on transaction details). In this case, a group of a corresponding user may be determined based on a section that includes a value of a specific item of a specific user. For example, if a value of a specific item of User a is less than [μ-3σ], User a may be classified into Group 1. As a value of a specific item of a specific user is further away from the average μ, probability that the specific user is classified into a risk group may further increase.

The computer apparatus 200 may calculate a score for each of the plurality of groups using a distance formula in which a distance and a directivity calculated for each item are considered. According to at least one example embodiment, the distance formula may be based on the distance and the directivity. According to at least one example embodiment, the distance may be a distance between a value of each item of each of transaction actions triggered by the users and an average value of a corresponding item. Here, a formula according to Mahalanobis' distance may be used as the distance formula. According to at least one example embodiment, the score may be used for determining whether the arbitrary user is included in the risk group in operation 330.

Referring again to FIG. 3, in operation 330, the computer apparatus 200 may determine whether the arbitrary user is included in the risk group based on groups to which the arbitrary user belongs among the plurality of groups classified for each of the transaction actions. For example, the computer apparatus 200 may determine whether the arbitrary user is included in the risk group based on a sum of scores set for the respective groups to which the arbitrary user belongs among the plurality of groups classified for each of the transaction actions. According to at least one example embodiment, the risk group corresponds to a group of users requesting potentially fraudulent transactions.

Figure 5:
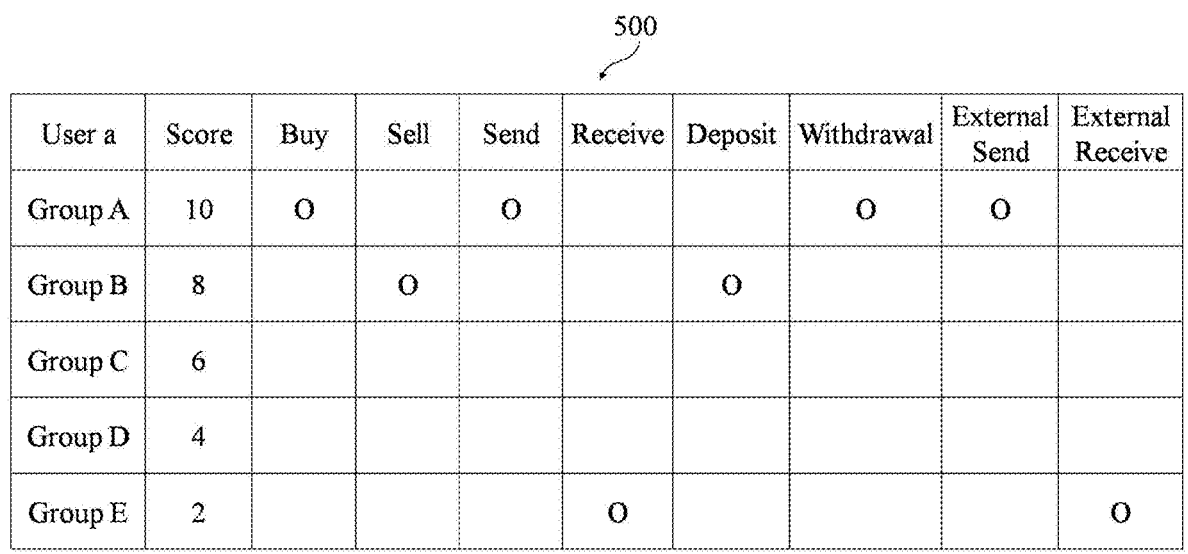

FIGS. 5 and 6 illustrate examples of groups to which arbitrary users belong for each of a plurality of transaction actions according to at least one example embodiment.

A table 500 of FIG. 5 represents a group to which User a belongs for each of transaction actions. That is, referring to the table 500, User a is classified into Group A for transaction actions "Buy," "Send," "Withdrawal," and "External Send," classified into Group B for transaction actions "Sell" and "Deposit," and classified into Group E for transaction actions "Receive" and "External Receive." Here, it may be assumed that, as a score of each of groups increases, a probability that users of a corresponding group may be included in a risk group increases. In this case, a sum of scores of the respective groups into which User a is classified may be calculated as 60(=10+8+10+2+8+10+10+2).

A table 600 of FIG. 6 represents a group into which User b is classified for each of transaction actions. Referring to the table 600, User b is classified into Group E for all of transaction actions "Buy," "Sell," "Send," "Receive," "Deposit," "Withdrawal," "External Send" and "External Receive." In this case, a sum of scores of the respective groups into which User b is classified may be calculated as 16(=2+2+2+2+2+2+2+2).

In this case, whether a specific user is included in a risk group may be determined based on a sum of scores. Herein, it will be easily understood that the higher the sum of scores, the higher a probability that a corresponding user may be included in the risk group. For example, the computer apparatus 200 described with FIG. 3 may classify users for which a sum of scores is greater than or equal to a preset or alternatively, given threshold, for example, 50, into the risk group. In this case, User a of which the sum of scores is calculated as 60 may be classified into the risk group.

A sum of scores described above may be calculated for each of the users corresponding to the collected transaction details and users classified into the risk group among users may be determined based on the calculated scores.

According to at least one example embodiment, it is possible to collect transaction details occurring in a financial institution, cluster users related to the transaction details into a plurality of groups for each of transaction actions (e.g., at least two transaction actions among Buy, Sell, Send, Receive, Deposit, Withdrawal, External Send, and/or External Receive), and classify an arbitrary user into a risk group based on scores set for groups of each of the transaction actions. According to at least one example embodiment, the computer apparatus 200 may block, prevent and/or limit a transaction requested by a user classified into the risk group. According to at least one example embodiment, the computer apparatus 200 may cause a transaction requested by a user classified into the risk group to be blocked, prevented and/or limited by generating and sending a signal indicating this classification to a corresponding financial institution (e.g., a financial institution requested to process the transaction).

Conventional fraudulent financial transaction detection systems and methods determine fraudulent transaction requests based on transaction request details and use patterns of previous customers. The conventional systems and methods do not determine fraudulent transaction requests based on transaction details corresponding to different transaction action types. Accordingly, the conventional systems and methods are insufficiently accurate in determining fraudulent transaction requests.

According to at least one example embodiment, improved systems and methods may be provided for fraudulent financial transaction detection. The improved systems and methods determine whether a user is in a risk group, corresponding to users requesting potentially fraudulent financial transactions, based on transaction details corresponding to different transaction action types. Accordingly, the improved systems and methods overcome the deficiencies of the conventional systems and methods to improve accuracy in determining fraudulent transaction requests.

According to at least one example embodiment, improved systems and methods may classify users classified as the risk group as monitoring targets, and monitor transactions of users classified as monitoring targets. In other words, it is possible to reduce the monitoring target from all users to the users classified as the risk group, thereby reducing monitoring costs related to fraudulent financial transaction.

According to at least one example embodiment, operations described herein as being performed by the computer apparatus 200 and/or the processor 220 may be performed by processing circuitry. The term 'processing circuitry,' as used in the present disclosure, may refer to, for example, hardware including logic circuits; a hardware/software combination such as a processor (e.g., at least one processor) executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In at least one example embodiment, the processing circuitry may perform some operations (e.g., the operations described herein as being performed by the machine learning module) by artificial intelligence and/or machine learning. As an example, the processing circuitry may implement an artificial neural network (e.g., the machine learning module) that is trained on a set of training data by, for example, a supervised, unsupervised, and/or reinforcement learning model, and wherein the processing circuitry may process a feature vector to provide output based upon the training. Such artificial neural networks may utilize a variety of artificial neural network organizational and processing models, such as convolutional neural networks (CNN), recurrent neural networks (RNN) optionally including long short-term memory (LSTM) units and/or gated recurrent units (GRU), stacking-based deep neural networks (S-DNN), state-space dynamic neural networks (S-SDNN), deconvolution networks, deep belief networks (DBN), and/or restricted Boltzmann machines (RBM). Alternatively or additionally, the processing circuitry may include other forms of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests.

The systems and/or the apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The above-described methods according to at least one example embodiment may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by app store that distributes applications or a site, a server, and the like that supplies and distributes other various types of software. Examples of a program instruction may include a machine language code produced by a compiler and a high-language code executable by a computer using an interpreter.

While this disclosure includes at least one example embodiment, it will be apparent to one of ordinary skill in the art that various alterations and modifications in form and details may be made without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A fraudulent financial transaction detection method performed by a computer apparatus comprising processing circuitry, the fraudulent financial transaction detection method comprising:
    collecting, by the processing circuitry, transaction details from a financial institution;
    first classifying, by the processing circuitry, each of a plurality of users into one among a set of first risk groups for a first transaction action type, the plurality of users corresponding to the transaction details, and each respective user among the plurality of users being classified into a corresponding first risk group among the set of first risk groups;
    second classifying, by the processing circuitry, each of the plurality of users into one among a set of second risk groups for a second transaction action type, each respective user among the plurality of users being classified into a corresponding second risk group among the set of second risk groups, the second transaction action type being different from the first transaction action type;
    determining, by the processing circuitry, whether a first user among the plurality of users is in a high-risk group based on a sum of scores set for a first set of risk groups, the first set of risk groups including,
        the corresponding first risk group into which the first user is classified, and
        the corresponding second risk group into which the first user is classified; and
    blocking, by the processing circuitry, a requested transaction in response to determining the first user is in the high-risk group.

2. The fraudulent financial transaction detection method of claim 1, wherein each of the first transaction action type and the second transaction action type comprises one of Buy, Sell, Send, Receive, Deposit, Withdrawal, External Send, or External Receive.

3. The fraudulent financial transaction detection method of claim 1, wherein the first classifying and the second classifying comprises inputting the transaction details to a machine learning module trained to classify users into the set of first risk groups and the set of second risk groups based on corresponding transaction details.

4. The fraudulent financial transaction detection method of claim 3, wherein the machine learning module is trained to output a score for each respective set of risk groups among the set of first risk groups and the set of second risk groups into which each corresponding user among the plurality of users is classified.

5. The fraudulent financial transaction detection method of claim 1, wherein the first classifying includes,
calculating an average value for each of a plurality of first transaction action items corresponding to the first transaction action type, and
classifying each of the plurality of users into the one among the set of first risk groups by clustering the plurality of users based on a first distance between a value of each of the plurality of first transaction action items and the average value of each of the plurality of first transaction action items, the plurality of first transaction action items corresponding to a plurality of first transaction actions triggered by the plurality of users; and the second classifying includes,
calculating an average value for each of a plurality of second transaction action items corresponding to the second transaction action type, and
classifying each of the plurality of users into the one among the set of second risk groups by clustering the plurality of users based on a second distance between a value of each of the plurality of second transaction action items and the average value of each of the plurality of second transaction action items, the plurality of second transaction action items corresponding to a plurality of second transaction actions triggered by the plurality of users.

6. The fraudulent financial transaction detection method of claim 5, wherein
the first classifying includes calculating a score of each among the set of first risk groups using a distance formula based on the first distance and a first directivity; and
the second classifying includes calculating a score of each among the set of second risk groups using the distance formula based on the second distance and a second directivity.

7. The fraudulent financial transaction detection method of claim 1, wherein
the first classifying includes classifying each of the plurality of users into the one among the set of first risk groups based on a value of each of a plurality of first transaction action items and a standard deviation of each of the plurality of first transaction action items, the plurality of first transaction action items corresponding to a plurality of first transaction actions triggered by the plurality of users; and
the second classifying includes classifying each of the plurality of users into the one among the set of second risk groups based on a value of each of a plurality of second transaction action items and a standard deviation of each of the plurality of second transaction action items, the plurality of second transaction action items corresponding to a plurality of second transaction actions triggered by the plurality of users.

8. The fraudulent financial transaction detection method of claim 7, wherein
each among the set of first risk groups is associated with a respective portion of a first probability density function corresponding to the plurality of first transaction action items, each respective portion of the first probability density function being separated by the standard deviation of each of the plurality of first transaction action items;
the first classifying includes classifying each of the plurality of users into the one among the set of first risk groups based on the respective portions of the first probability density function into which the value of each of the plurality of first transaction action items corresponds;
each among the set of second risk groups is associated with a respective portion of a second probability density function corresponding to the plurality of second transaction action items, each respective portion of the second probability density function being separated by the standard deviation of each of the plurality of second transaction action items; and
the second classifying includes classifying each of the plurality of users into the one among the set of second risk groups based on the respective portions of the second probability density function into which the value of each of the plurality of second transaction action items corresponds.

9. The fraudulent financial transaction detection method of claim 1, further comprising:
generating a signal indicating that the first user is in the high-risk group in response to determining the first user is in the high-risk group.

10. The fraudulent financial transaction detection method of claim 9, wherein the blocking comprises causing the requested transaction to be blocked by sending the signal to the financial institution.

11. The fraudulent financial transaction detection method of claim 1, further comprising:
third classifying, by the processing circuitry, each of the plurality of users into one among a set of third risk groups for a third transaction action type, each respective user among the plurality of users being classified into a corresponding third risk group among the set of third risk groups, the third transaction action type being different from the first transaction action type and the second transaction action type,
wherein the first set of risk groups includes,
the corresponding first risk group into which the first user is classified,
the corresponding second risk group into which the first user is classified, and
the corresponding third risk group into which the first user is classified.

12. The fraudulent financial transaction detection method of claim 1, wherein the determining comprises determining that the first user is in the high-risk group based on the sum of scores exceeding a threshold value associated with the high-risk group.

13. The fraudulent financial transaction detection method of claim 1, wherein
each first risk group among the set of first risk groups is associated with a different respective first score;
each second risk group among the set of second risk groups is associated with a different respective second score; and the method further comprises calculating the sum of scores as the sum of, the respective first score associated with the corresponding first risk group; and the respective second score associated with the corresponding second risk group.

14. A non-transitory computer-readable record medium storing instructions that, when executed by at least one processor, cause the at least one processor to perform a fraudulent financial transaction detection method, the fraudulent financial transaction detection method comprising:

collecting, by the at least one processor, transaction details from a financial institution;

first classifying, by the at least one processor, each of a plurality of users into one among a set of first risk groups for a first transaction action type, the plurality of users corresponding to the transaction details, and each respective user among the plurality of users being classified into a corresponding first risk group among the set of first risk groups;

second classifying, by the at least one processor, each of the plurality of users into one among a set of second risk groups for a second transaction action type, each respective user among the plurality of users being classified into a corresponding second risk group among the set of second risk groups, the second transaction action type being different from the first transaction action type;

determining, by the at least one processor, whether a first user among the plurality of users is in a high-risk group based on a sum of scores set for a first set of risk groups, the first set of risk groups including, the corresponding first risk group into which the first user is classified, and the corresponding second risk group into which the first user is classified; and blocking, by the at least one processor, a requested transaction in response to determining the first user is in the high-risk group.

15. A computer apparatus comprising:

processing circuitry configured to cause the computer apparatus to, collect transaction details from a financial institution, first classify each of a plurality of users into one among a set of first risk groups for a first transaction action type, the plurality of users corresponding to the transaction details, and each respective user among the plurality of users being classified into a corresponding first risk group among the set of first risk groups, second classify each of the plurality of users into one among a set of second risk groups for a second transaction action type, each respective user among the plurality of users being classified into a corresponding second risk group among the set of second risk groups, the second transaction action type being different from the first transaction action type, determine whether a first user among the plurality of users is in a high-risk group based on a sum of scores set for a first set of risk groups, the first set of risk groups including, the corresponding first risk group into which the first user is classified, and the corresponding second risk group into which the first user is classified, and block a requested transaction in response to determining the first user is in the high-risk group.

16. The computer apparatus of claim 15, wherein the processing circuitry is configured to cause the computer apparatus to perform the first classification and the second classification including inputting the transaction details to a machine learning module trained to classify users into the set of first risk groups and the set of second risk groups based on corresponding transaction details.

17. The computer apparatus of claim 16, wherein the machine learning module is trained to output a score for each respective set of risk groups among the set of first risk groups and the set of second risk groups into which each corresponding user among the plurality of users is classified.

18. The computer apparatus of claim 15, wherein the processing circuitry is configured to cause the computer apparatus to:

first classify each of the plurality of users into the one among the set of first risk groups including, calculating an average value for each of a plurality of first transaction action items corresponding to the first transaction action type, and classify each of the plurality of users into the one among the set of first risk groups by clustering the plurality of users based on a first distance between a value of each of the plurality of first transaction action items and the average value of each of the plurality of first transaction action items; and second classify each of the plurality of users into the one among the set of second risk groups including, calculating an average value for each of a plurality of second transaction action items corresponding to the second transaction action type, and classify each of the plurality of users into the one among the set of second risk groups by clustering the plurality of users based on a second distance between a value of each of the plurality of second transaction action items and the average value of each of the plurality of second transaction action items.

19. The computer apparatus of claim 18, wherein the processing circuitry is configured to cause the computer apparatus to:

first classify each of the plurality of users into the one among the set of first risk groups including calculating a score of each among the set of first risk groups using a distance formula based on the first distance and a first directivity; and second classify each of the plurality of users into the one among the set of second risk groups including calculating a score of each among the set of second risk groups using the distance formula based on the second distance and a second directivity.

20. The computer apparatus of claim 15, wherein the processing circuitry is configured to cause the computer apparatus to:

first classify each of the plurality of users into the one among the set of first risk groups based on a value of each of a plurality of first transaction action items and a standard deviation each of the plurality of first transaction action items, the plurality of first transaction action items corresponding to a plurality of first transaction actions triggered by the plurality of users; and second classify each of the plurality of users into the one among the set of second risk groups based on a value of each of a plurality of second transaction action items and a standard deviation each of the plurality of second transaction action items, the plurality of second transaction action items corresponding to a plurality of second transaction actions triggered by the plurality of users.

21. The computer apparatus of claim 15, wherein each of the first transaction action type and the second transaction action type comprises one of Buy, Sell, Send, Receive, Deposit, Withdrawal, External Send, or External Receive.

\* \* \* \* \*